Aug. 26, 1947.   E. M. DELORAINE ET AL   2,426,184
RADIO GUIDING SYSTEM
Filed March 13, 1944   3 Sheets-Sheet 1
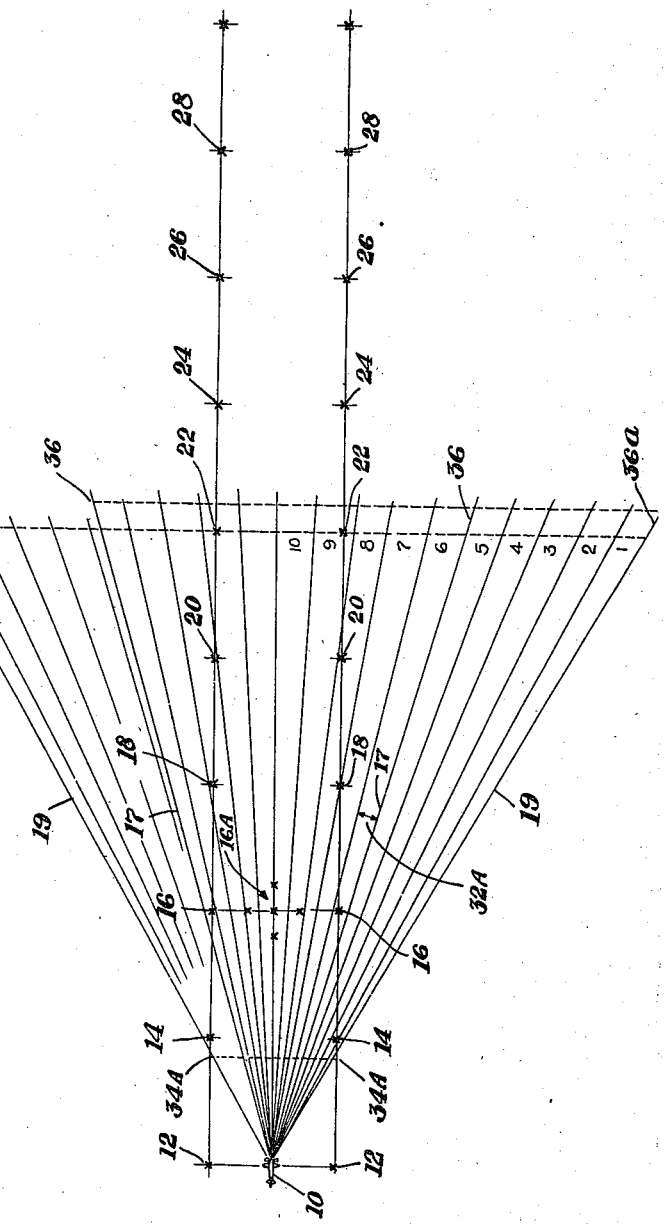
INVENTORS
EDMOND M. DELORAINE
GERARD J. LEHMANN
BY
ATTORNEY

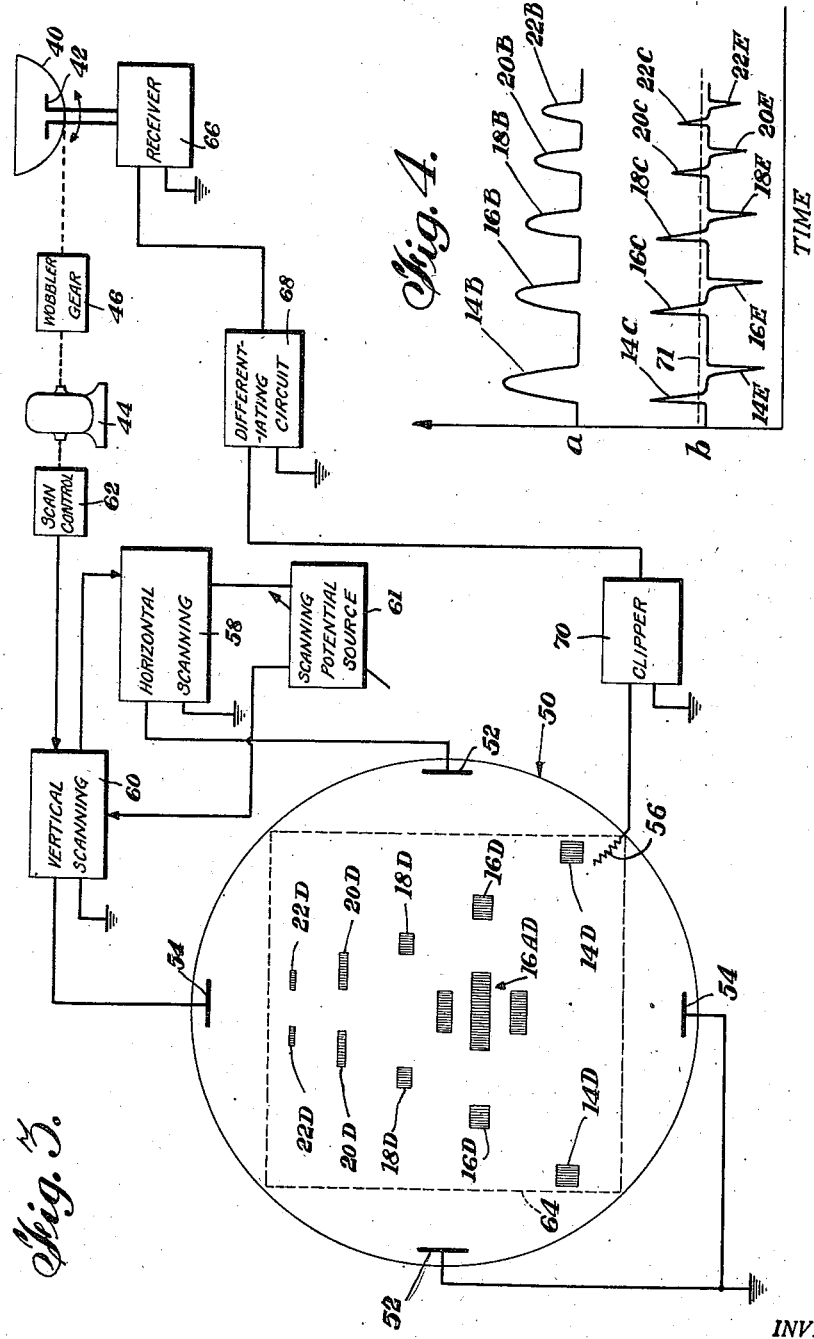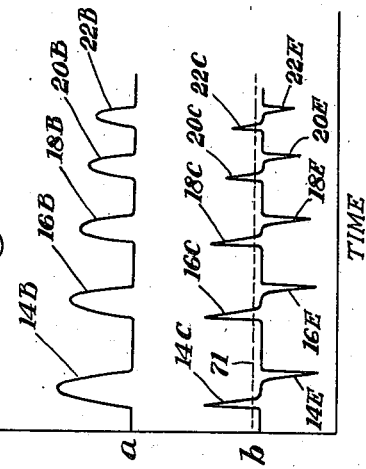

Aug. 26, 1947.　　E. M. DELORAINE ET AL　　2,426,184
RADIO GUIDING SYSTEM
Filed March 13, 1944　　3 Sheets-Sheet 3
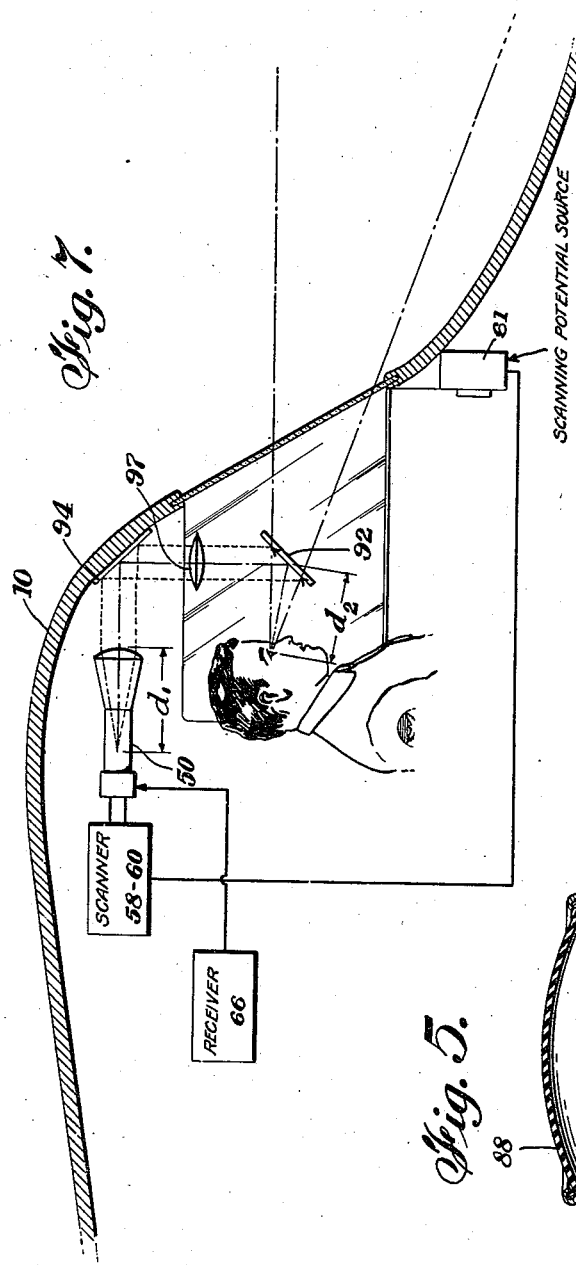
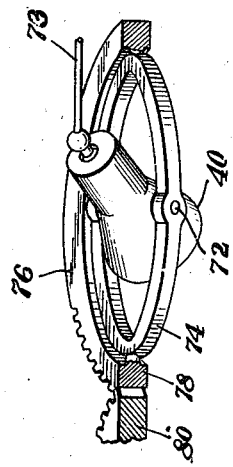
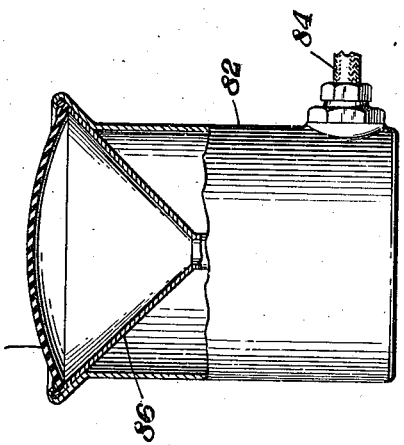
INVENTORS
EDMOND M. DELORAINE
GERARD J. LEHMANN
BY
ATTORNEY Patented Aug. 26, 1947

2,426,184

UNITED STATES PATENT OFFICE 2,426,184

RADIO GUIDING SYSTEM

Edmond M. Deloraine and Gerard J. Lehmann, New York, N. Y., assignors to Federal Telephone and Radio Corporation, New York, N. Y., a corporation of Delaware Application March 13, 1944, Serial No. 526,151

15 Claims. (Cl. 250—11)

This invention relates to radio guiding systems and more particularly to systems for guiding aircraft along a predetermined course to a landing.

Numerous beacon and other guiding systems have been proposed wherein radio indications are provided to show the position of a craft relative to a point on the earth's surface or to a course along which a craft desires to travel. In all of these proposed systems, however, the pilot of the craft generally prefers to depend upon his direct visual observation of the landscape or landing lights. The indicating instruments are generally arranged in a panel where they may be readily observed but even during periods when direct visibility is substantially blanketed, as by fog, the pilot tends to keep looking away from the instruments and out through the windows of the craft to see if direct visibility can be obtained. As a consequence, when landing an aircraft during the conditions of zero visibility, the pilot is continuously looking away from the instruments and may depart from the proper courfse, as indicated by the instruments during these periods. Furthermore, an added strain on the pilot is produced by this attempt to observe at two different places the position of his craft.

A system has previously been proposed in which a plurality of transmitters located about an airport are scanned by directive receiving antennae adn caused to produce on an oscillograph on the instrument panel a plurality of spots corresponding to the position of the radiators outlining the airport. In this proposed system, however, the instrument panel must be referred to in the same manner as in other types of indicators. Furthermore, no provision is made for particularly sharpening the beam used in the scanning nor for using the portion of the beam which is most rapidly changing, thus producing an effective narrowing of the beam.

It is accordingly an object of our invention to provide an indicating system in which the view from the windows of a craft or other visual observation opening has superimposed on it the instrument indications so that the pilot need not remove his gaze from the indicating instrument in order to make a direct visual observation of the terrain.

It is a further object of our invention to provide a visual indication simulating the lights along an airport or landing strip and producing this indication in a position where it may be viewed by the pilot of a craft simultaneously with a direct observation of the landing lights.

It is a still further object of our invention to provide a radio scanning system for producing effectively an extremely narrow scanning beam.

It is a still further object of our invention to provide a simulation of the landing lights of an airport in such a position with respect to the pilot and of such dimensions that the simulating indications will substantially coincide with the direct visual indications.

It is a still further object of our invention to provide a guiding system in which indications are provided substantially simulating the observed conditions during periods of normal visibility, and are positioned for simultaneous viewing with the objects seen during periods of normal visibility.

According to a feature of our invention, we provide a semi-transparent reproducing screen, such as a half-silvered mirror or a partial ground glass screen, through which a pilot may normally obtain a direct visual view of the area immediately in front of the craft. In addition, we provide indicating instruments related to the reflecting screen in position such that the indications are imposed on the reproducing screen. This provides in front of the pilot or other observer a superposition of the instrument indications and the direct visual view of the area immediately in front of the pilot.

According to a further feature of our invention, we provide on the craft a directive radio receiving antenna which has a narrow radiant acting sector preferably substantially in the form of a cone. This directive beam is caused to scan over an area substantially coextensive with the direct view of the pilot from his observation windows. Over the area scanned by the beam are provided low powered radio transmitters which may, for example, be positioned on the same posts as are the landing lights at an airport. The directive antenna, as it scans over the area, receives impulses when it comes into alignment with one of these transmitters. These impulses correspond substantially in time position to the location of these radio transmitters in the area scanned. On the craft is also provided an oscillograph, the beam of which is scanned over a screen representing substantially the area scanned by the directive antenna. The scanning of the beam of the oscillograph is synchronized with that of the antenna so that the beam will be positioned over a surface on the screen coinciding substantially with the area covered by the directive antenna radiant acting pattern. Coupled to the directive antenna is provided a receiver which receives and detects energy effective on the antenna to produce an envelope wave having a configuration of pulses dependent upon the energy received. This envelope wave is applied to the oscillograph to control the intensity of the beam.

In order more sharply to define the objects scanned, a portion of the scanning reception beam in which there is a rapid rate of change of received energy is used. This result may be accomplished by differentiating the pulses of the envelope wave to produce other sharper pulses defining the beginning and the end of the envelope pulses. Either of these differential pulses may be applied to the oscillograph control. The beam thus traces a pattern on the screen of the oscillograph producing illuminations substantially coinciding with the positions of the radiating units on the ground area scanned. Since these radiators are preferably positioned at points coinciding with the landing lights and other airport lights, the pattern produced on the oscillograph screen will substantially simulate the visual pattern of lights observed by the pilot under normal conditions.

The produced simulated pattern may be superimposed on the direct visual pattern as seen by the pilot. Preferably, this simulated pattern is adjusted in position so that the image produced on the screen coincides with the direct visual observation of the landing lights, in dimensions and position. The pilot may, therefore, proceed into the field for landing, for example, in the normal manner using the visual observation of the lights to indicate his position with respect to the landing runways, both in altitude and laterally. However, in cases of poor visibility, the simulated indication which is also present in front of the pilot, may be used as the guiding system to help steer the craft to landing on the runway.

It will be observed that with this arrangement, the pilot need not change this position to look out at the landing area or to look at the indicator reading. Furthermore, at all times the indication before the pilot will be a substantial simulation of the landing light pattern and other light patterns of the airport and will, therefore, appear more natural to him. Accordingly, he will not require such specialized training in order to steer the craft into an instrument landing as may be necessary when the usual form of instrument is used.

A better understanding of our invention may be had from the particular description and modifications thereof, made with reference to the accompanying drawings, in which:

Fig. 1 is a diagram in elevation showing an aircraft approaching a landing using the system in accordance with our invention;

Fig. 2 is a diagram in plan view of the same aircraft and landing field arrangement shown in Fig. 1;

Fig. 3 is a circuit diagram partly in block of a receiver system in accordance with our invention;

Fig. 4 is a set of curves used in explaining the operation of the circuit in Fig. 3;

Fig. 5 is an elevation partly in section of a transmitter unit which may be used in the system of our invention;

Fig. 6 is an illustration in perspective with parts in section of a scanning mechanism for moving the receiving antenna shown in Fig. 2; and Fig. 7 is a diagrammatic illustration of a composite indicator system in accordance with our invention.

Turning to Figs. 1 and 2, an aircraft is indicated at 10 approaching a landing runway marked by radiators 12, 14, 16, 18, 20, 22, 24, 26 and 28. Each of these radiators may correspond to lights normally placed on opposite sides of the runway. Preferably, low power radio transmitting units are mounted on the same posts supporting the regular landing lights. At the beginning of the runway may be provided a special marker arrangement consisting of the four radiating units arranged as shown at 16A, Fig. 2. Craft 10 is approaching the runway along line 30 so that the point of contact of the craft with the runway will occur substantially at the point 36. In the diagram as the craft approaches the runway a sharply directive radiation receiver, such as a beam type antenna, is caused to scan the field in advance of the craft. This movement may be made vertically between lines 30 and 31 and horizontally between other limits, such as indicated at 17—17 or 19—19, Fig. 2. Preferably, the system is working at very high radio frequencies. For example, the system may be working at a frequency such that a wavelength is between one and two centimeters in length.

The scanning beam, as indicated at 32, Fig. 1, and 32A, Fig. 2, may, for example, be such that the spread is at substantially three degrees. To accomplish this with an antenna and reflector, the opening of the parabolic reflector must be substantially 20 wavelengths. Thus, at one and one-half centimeters, the opening of the reflector would be 30 centimeters. As the reflector is scanned up and down in the vertical plane and back and forth in the horizontal plane, the beam serves to scan an area indicated generally between lines 34—34 and 36—36 of Fig. 2, assuming a 30° horizontal swing or the area defined by the lines 34A—34A, 36A—36A if the horizontal sweep is made to be 60°. With a 3° spread to the beam and a 30° horizontal scanning frame, there will be ten lines to a frame and with the 60° spread twenty lines, assuming no overlap on the beam, as indicated in Fig. 2. Of course, this will not provide an extremely well defined reproduction but will provide a fair approximation of the desired pattern.

As shown in Fig. 1, the beam, when it reaches its most nearly vertical swing, shown in this example as substantially 20° from the horizontal, will spread in front of the craft a distance defined by 34—14, of Fig. 1. As the beam approaches more nearly a horizontal line this spreads until at the top of the swing it covers substantially a distance from 15 to point 36.

It should be understood, however, that this scanning beam is much stronger at the center line of the radiation pattern than it is at the edges. Accordingly, the energy received on the craft 10 from the portions of the beam when it is widely spread, as shown at the upper extreme of the swing, will be lower in amplitude near the edges of this spread. By suitably choosing the constants of the receiving circuit, the system may operate so that only the radiating unit near the center of the beam, such as shown at 20, will produce sufficient signal energy to produce an indication on the craft. As the beam is swung in the horizontal field the spread does not alter but remains constant at 3° as indicated at 32A of Fig. 2. It will thus be appreciated that as the beam is scanned over this area, the separate radiators 14, 16, 18, 20, 22 and 16A may be reproduced on an indicator on craft 10 in the manner of a television picture. Each of the radiators may be caused to appear as a spot of light on the screen of an oscillograph. With the relatively wide scanning beam the spots of light on the oscillograph screen will generally be of the same width. When, however, the beam is such as to twice scan the same radiator in successive lines, the spot may appear on the screen as twice the normal width of the beam, and somewhat less brilliant.

Likewise, since the linear velocity of the scanning beam is greater, the further the swinging is from the craft, the radiators 22 at the remote portion of scanning field will appear much closer together on the indicating screen than will radiators 14 which are relatively close to the craft. Accordingly, on the indicator will be produced a simulation of the landing lights of the field having a perspective indication substantially the same as that impression made on the human eye by visually observing the lights arranged at these points. The degree of definition of the indications will depend upon the number of scanning lines provided over the area, and the sharpness of the scanning beam.

A circuit arrangement for the craft receiver is shown in Fig. 3. In this arrangement there is provided a reflector 40 having mounted at the focus thereof an antenna 42. By means of a motor 44 and a wobbler gear mechanism 46, reflector 40 is caused to oscillate in two directions, providing a scanning movement so that the directive antenna will be effective over a given area in front thereof. Also on the craft is provided an oscillograph 50 indicated as a cathode ray oscillograph in Fig. 3 and provided with horizontal deflector plates 52 and vertical deflector plates 54 as well as a control grid 56 which serves to control the intensity of the cathode ray beam. The horizontal scannnig waves may be produced in a horizontal scanning circuit 58 and the vertical scanning potentials may be produced in the vertical scanning generator 60. A variable scanning potential source 61 is provided to control the angular sweep of the cathode ray beam, as may be desired.

Both of these scanning generators are controlled by a scanning control mechanism 62 so that the beam of the cathode ray oscillograph will be scanning over the surface 64 in the same timed relation as the directive radiant acting pattern 40 is scanned over the area on the surface of the earth to be simulated. As the directive action of the antenna assembly 40—42 is swept over the field containing the various radiators, there is produced in receiver 66 a wave form having impulses corresponding to the passage of the reception beam of antenna 42 over the separate radiators. Thus, the separate radiators 14, 16, 18, 20 and 22 will produce pulses of energy, for example, as shown in curve a of Fig. 4 at 14B, 16B, 18B, 20B and 22B. These pulses may be applied to control grid 56 as the beam of the cathode ray oscillograph is scanned over the surface causing the beam to produce bright spots on the screen corresponding to the time position of the pulses. These spots will be of a width dependent upon the scanning beam width and will vary in length and brightness dependent upon the distance of the radiators from the receiver. Thus, the radiating units 14, 16, 18, 20, 22 and 16 produce on the surface of the screen the bright patterns shown at 14D, 16D, 18D, 20D, 22D and 16D. This pattern simulates the direct visual view of the visible light sources arranged at the corresponding points along the landing runway.

The sharply directive beam still has considerable spread as can be readily appreciated from the form of pulses 14B—22B, Fig. 4. This spread may be greatly reduced and the beam may be effectively sharpened by using, for example, the leading edge of the beam to shorten the light spots on the screen and increase the visual separation. This may be accomplished by applying the output of receiver 66 to a differentiating circuit 68. In the output of the differentiating circuit 68 will then be produced pulses such as shown in curve b, Fig. 4. At the point where curve a of Fig. 4 changes so that pulses 14B, 16B, etc., start to rise, there is a maximum rate of change, thus producing in the output of the differentiating circuit a series of pulses 14C, 16C, 18C, 20C and 22C. Similarly at the point where pulses 14B, etc., terminate is a second maximum rate of change producing a series of pulses 14E, 16E, 18E, 20E and 22E of opposite polarity to pulses 14C, 16C, etc.

Each of these pulses is quite sharp but they are progressively lower in amplitude due to the attenuation of the radio signals. These pulses may be clipped at a clipping level indicated at 71 in clipper 70 before application to control grid 56. It is clear that, if desired, the differentiated pulses 14E, etc., may be selected by clipping instead of the pulses 14C, etc. With this circuit the scanning beam is effectively shaped so that the spots reproduced on the screen of the oscillograph will be more sharply defined. As in other picture reproducing systems the definition of the image produced will depend in part on the scanning frequency. Preferably, since the vertical scanning angle is smaller than the horizontal scanning angle, the beam will be scanned up and down in the screen at a relatively rapid rate and progressively scanned across the screen in the horizontal at a rate corresponding to the framing frequency of the picture.

In order that the radiators may simulate the light of the runway and at the marker points each of the radiators may, for example, take the form shown in Fig. 5. In accordance with this arrangement, the transmitting unit is housed within the housing 82 and supplied with power over a line 84. A radiating horn 86 may be provided and covered with a dielectric cover 88 which serves to prevent dust and moisture from entering the housing and adversely affecting the operation of the transmitter. It is clear that other forms of transmitters may be used, as desired, and that the radiator may be caused to produce any desired pattern. Preferably, the radiator should be so designed as to produce a radiation pattern substantially the same in shape as the visible light radiation pattern produced by the light sources mounted on the same towers.

For the purpose of scanning, the receiving antenna may be of a structure similar to that shown in Fig. 6. In this arrangement, the reflector 40 is caused to vary in the vertical plane by means of a crank arm 73. Crank arm 73 driven by a suitable mechanism, not shown, causing reflector 40 to rock back and forth in pinions 72 in ring 74. Ring 74 is fastened by means of pins 78 to a partial ring gear 76. This ring gear 76 is meshed with a driving gear 80 so as to oscillate ring 74 and reflector 40 back and forth in a horizontal plane. Thus, the two motions necessary for scanning the beam over a given area are provided.

The scanning frequencies for the system are preferably chosen to give sufficient definition for the purpose, as is practical with the scanning system used. The definition need not be made to provide as good as resolution as would be required for actual picture transmission. It is clear also that other marker antennas may be arranged along the runway to give further indications on the craft. Likewise, various hangars and other structures on the airport may be outlined in radiating elements, if desired, so that a rough picture of the entire airport area may be produced on the screen at the receiver. Preferably, when using the system for landing an aircraft, there is also provided on the craft a sensitive absolute altimeter which will furnish the pilot accurate information of his altitude above the ground level. A rough approximation of his altitude is, of course, given by the perspective view of the landing lights as simulated on the screen.

In order that the pilot may be enabled to observe the indicator readings while still having direct visual observation of the landing field, an arrangement such as shown in Fig. 7 may be provided. The indicator is mounted, as shown at 50 within the aircraft 10. A semi-transparent screen element 92 is mounted in front of the pilot. This semi-transparent element may, for example, be a half-silvered mirror, or a projection screen, so that a direct observation of objects may be made through the mirror itself. This will cut down the light by about 50% but will still permit sufficient visibility to see the lights at the landing field and the adjacent terrain at times of normal visibility. The indications from the screen of oscillograph 50 are transposed by means of mirror 94 and optical system 96 on to the upper surface of screen 92. The image projected on to the screen will be superimposed on the visual pattern obtained by direct observation. As a consequence, the pilot may be able to fly his plane into a landing by direct visbility when conditions permit. At the same time, the instrument indications are always in front of him.

Accordingly, he will normally correlate the instrument indications and the visual indications and thus will be conscious of the proper indications for suitable landing. Thus, in times of poor visibility he will depend directly on the instrument indications. He will not have to look away from the instrument indications in order to observe whether or not the visibility conditions at the landing field are insufficient for him to obtain the information directly.

Furthermore, the oscillograph is preferably arranged so that the pattern on the screen will not only substantially simulate the visual pattern on the field but will substantially coincide therewith.

Referring again to Fig. 7, it is desirable that the image on the screen of indicator 50 be reproduced on the semi-transparent screen 92 in substantially the same dimensions as the actual object is directly viewed. If the optical system 97 has a 1:1 magnification, then the distance $d1$ from the scanning focus to the screen of tube 50 should be equal to the distance $d2$ from the eye of the pilot to substantially the center point of screen 92, if screen 92 is a projection screen upon which is projected a real image of the pattern on oscillograph 50. Thus, if the screen is made to have ground glass portions, for example, interspersed by clearly transparent portions, a real image may be projected on the screen in front of the pilot. In order that the image may be properly aligned with the actual viewed objects, oscillograph 50 may be turned to the proper angle. If the optical system 97 normally produces a reversal of the image, then the oscillograph should be positioned so that a direct view would show the inverted image.

Furthermore, it may be desirable to slightly adjust the swing of the beam of oscillograph 50 producing the image or simulating spots to bring the indications into proper superposed relation. This may be accomplished by adjusting the controls of scanning potential source 61 to produce the desired sweep of the beam in oscillograph 50. The image spots produced by receiver 66 in oscillograph 50 will then be positioned substantially identically with the lights, as actually seen by the pilot.

If screen 92 is made to be a semi-transparent reflecting surface, then the image produced thereon will be a virtual image rather than a real image. Under these circumstances, distance $d2$ should be made equal to one-half distance $d1$ so that the reproduced simulation will substantially coincide with the actual view. Furthermore, in either of the systems of projection, if the optical system 97 produces any magnification of the object to be viewed, then a magnification factor K must be considered in producing the proper adjustment of the projected image to secure the desired superposition. The desired relation may be expressed by the equation $Kd1=Cd2$—where $d1$ and $d2$ have the values given above, K is a magnification factor and C is 1 or 2, depending upon whether the image on the screen is a real or a virtual image.

Since the pilot may, therefore, simultaneously view the image indication and the direct landing field and since the proper adjustments are made, the simulated perspective view of the landing area produced on screen 92 will substantially coincide with the actual visible light pattern. If desired, the indicator screen may be made to have a different fluorescence colour than the colour of the normal lights so that there will be no confusion between the simulated pattern and the directly visible pattern.

The arrangement shown in Fig. 7 need not be limited to systems in which the instrument indication provides a simulation of the light pattern at the landing airport. While this is the preferred type of indicator to be used, it is clear that the arrangement illustrated in Fig. 7 will be useful even with the present conventional type of landing instruments. Thus, with the instruments arranged in a position, as shown, there will be produced on the same screen 92 through which the pilot directly observes the airport, an image of the instruments. The pilot will, therefore, have the advantage of being able to read these indications without having to remove his gaze from the normal scene in front of the window.

While we have described our invention in connection with a specific diagram and certain modifications thereof, it is clear that the principles of our invention are much broader than the structures embodied in these particular diagrams. This diagrammatic illustration is intended merely as an example of our invention and not as a limitation on the scope thereof, as set forth in the objects of the invention and in the accompanying claims.

What is claimed is:

1. An aircraft guiding means comprising, a semi-transparent viewing screen substantially within the normal field of view of the pilot of the craft when viewing the terrain, and means for reproducing on said screen the image of radio transmitters in their proper positions relative to the said terrain.

2. An aircraft indicator for indicating the location of radio beacon transmitters distributed over a given area, comprising a semi-transparent visual screen carried by said aircraft, indicator means responsive to radiation from said beacon transmitters for reproducing on said screen a simulation of the distribution of said beacons within said area, and means for mounting said screen in front of the pilot substantially within the pilot's normal field of view of said area.

3. Means for guiding a craft over an area having radio transmitters comprising a directional radio antenna means on said craft, means for moving said directional antenna means to scan a predetermined area with respect to said craft, receiver means for receiving energy from radio transmitters in the field of said directional antenna means, and semi-transparent indicator means mounted in the normal field of vision of the pilot of said craft when viewing the terrain for visually reproducing in response to received energy a pattern substantially simulating the distribution of radio transmitters located in the scanning field of said antenna means in response to received energy.

4. In a radio guiding system for guiding an aircraft over an area provided with radio transmitters, comprising a directive antenna means mounted on said aircraft, means for scanning the directive pattern of said antenna means over a predetermined portion of said area with respect to said aircraft to receive radio energy from transmitters located in said predetermined area, receiver means coupled to said directive antenna means for receiving energy picked up by said antenna means during the scanning operation to produce output waves having energy, pulses of energy corresponding to the energy picked up, differentiating means for differentiating said pulses to produce narrow pulses corresponding to the energy pulses and producing an effective narrowing of the receiver scanning beam, an oscillograph indicator, means for scanning the beam of said oscillograph indicator in timed relation over a surface on the screen of said indicator corresponding to said predetermined area scanned by the directive antenna means, and means for applying said narrow pulses to a control electrode in said oscillograph to produce indications on the screen thereof corresponding in position to the position of radiating means in said area.

5. A combination in accordance with claim 4, further comprising means for combining a reproduction of the indications on said screen with a visual view of the area being scanned in superposed relation.

6. A system for guiding aircraft comprising a semi-transparent viewing screen arranged in front of the pilot in the normal field of view so that the pilot when viewing the terrain in front thereof sees through the screen, means at said aircraft for producing a guiding indication including simulation of objects on said terrain, and means for reproducing said guiding indication on the viewing surface of said screen whereby the pilot may at times observe both the guiding indication and the said terrain relative to the craft.

7. The combination according to claim 6 wherein said viewing surface is a semi-reflecting surface.

8. A guiding system for aircraft for providing a visual simulation of the runway lights and other lights at an airport, comprising radiating means operating at a predetermined radio frequency, arranged at said airport adjacent said lights, directive radiation receiving means provided on said airport, receiver means tuned to said radio frequency coupled to said radiation receiving means, means for moving said radiation receiving means to scan the radiant acting pattern thereof over a desired portion of said airport, whereby waves will be produced in the output of said receiver having impulses corresponding in amplitude and time position to the energy received during said scanning, differentiating means, and limiting means coupled to the output of said receiver means, effectively to sharpen the impulses in said output waves, an oscillograph having a screen, means for scanning its beam over a predetermined surface of said screen in timed relation with the scanning of said radiant acting pattern, and means responsive to said sharpened impulses for controlling the brilliance of said beam, whereby there is reproduced on said screen a sharply defined light pattern simulating the lights at said airport within said desired portion of said airport.

9. A system according to claim 8, further comprising a semi-transparent viewing screen mounted on said aircraft in the field of vision of the pilot, and means for projecting the light pattern from said oscillograph screen on to said viewing screen to provide a simulation of said lights thereon whereby the pilot may obtain a visual indication of said simulation simultaneously with a direct view of said airport.

10. A method of producing a visual simulation on the surface of an indicator of the position of radio transmitters in a given area at a fixed location with the use of a directive radiation receiving means, comprising moving said radiation receiving means to scan the directive pattern thereof over said area, receiving successively energy from said transmitters during said scanning, and producing in the normal field of vision of an observer of the given area a simulation of the location in said given area of said radio transmitters in response to said received energy.

11. A system for guiding an aircraft to a landing comprising means at said aircraft for producing a guiding indication simulating the position of landing lights at an airport, a semi-transparent viewing screen arranged in front of the pilot within his normal field of view of the said airport so that the screen may be observed simultaneously with a visual observation of the said landing lights, and optical means for projecting an image of said guiding indication onto said screen.

12. A system according to claim 11, further comprising means for positioning said indication producing means so that the simulated light images projected onto said screen appear in positions substantially coincident with the directly viewed lights.

13. A system according to claim 11, wherein said screen has a semi-reflecting surface, whereby said projected image is a virtual image.

14. A system according to claim 11, wherein said screen has a normally opaque non-reflecting surface, whereby said image is a real image.

15. Means for guiding an aircraft comprising a viewing screen arranged substantially within the normal field of vision of the pilot so that said screen and the observable terrain in front of the craft are in substantial superposition before the pilot, means at said aircraft for producing a guiding indication including simulation of objects on said terrain, and means for reproducing said guiding indication on said screen whereby the pilot may at times observe both the guide indication and the terrain relative to the craft.

EDMOND M. DELORAINE.
GERARD J. LEHMANN.

REFERENCES CITED

The following references are of record in the file of this patent:

UNITED STATES PATENTS

| Number | Name | Date |
|---|---|---|
| 2,251,984 | Cleaver et al. | Aug. 12, 1941 |
| 2,301,826 | Steudel et al. | Nov. 10, 1942 |
| 2,130,913 | Tolson | Sept. 20, 1938 |
| 2,151,549 | Becker | Mar. 21, 1939 |
| 2,226,860 | Greig | Dec. 31, 1940 |
| 2,279,246 | Podliasky et al. | Apr. 7, 1942 |